F. A. Armbruster,
Turning Regular Forms.
Nº 61,135. Patented Jan. 15, 1867.
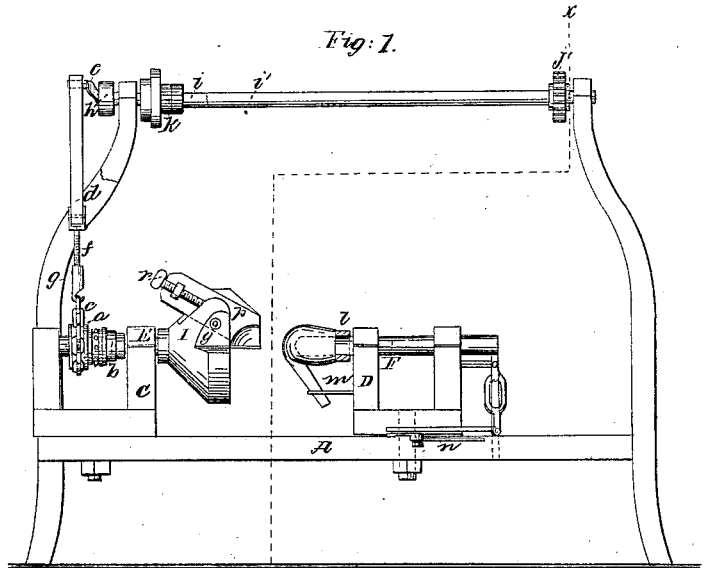
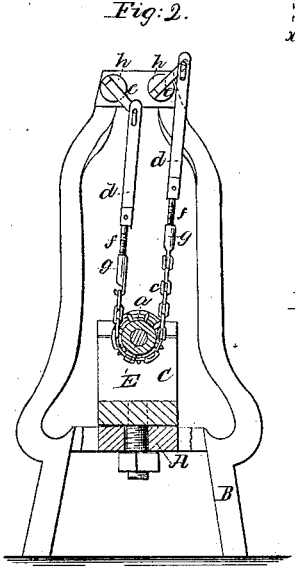
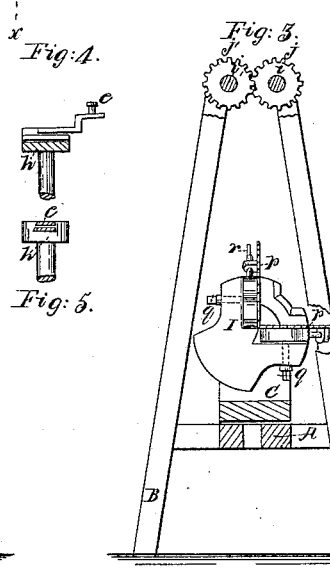
Witnesses:
Inventor:

UNITED STATES PATENT OFFICE.

FRANTZ ANTON ARMBRUSTER, OF NEW YORK, N. Y.

Letters Patent No. 61,135, dated January 15, 1867; antedated January 3, 1867.

---

IMPROVEMENT IN TURNING LATHES.

---

The Schedule referred to in these Letters Patent and making part of the same.

---

TO ALL WHOM IT MAY CONCERN:

Be it known that I, FRANTZ ANTON ARMBRUSTER, of the city, county, and State of New York, have invented a new and improved Turning Machine; and I do hereby declare that the following is a full, clear, and exact description thereof, which will enable others skilled in the art to make and use the same, reference being had to the accompanying drawings, forming part of this specification, in which—

Figure 1 represents a side elevation of this invention.

Figure 2 is a sectional end view of the same.

Figure 3 is a transverse section of the same, the line $x\,x$, fig. 1, indicating the plane of section.

Figures 4 and 5 are details, which will be referred to as the description progresses.

Similar letters of reference indicate like parts.

This invention relates to a turning lathe which is intended particularly for the manufacture of pipes, but which can also be used for articles of any other description. The tool or tools used in turning are secured to a chuck, which is fastened on the spindle of the lathe; and said spindle is so arranged that an oscillating motion can be imparted to it, for the purpose of turning such parts as, for instance, that portion of the bowl of a smoking-pipe where the same joins the stem, and where the tool cannot pass clear round. The oscillations of the tool-holder can be increased or decreased according to the article to be turned.

A represents the shears of my turning lathe, which are made of wood, iron, or any other suitable material, and which are supported by the legs B. On the shears are secured the head-blocks or puppets C D, one of which forms the bearings for the lathe spindle E, and the other those for the back centre F. On the lathe spindle is mounted a chain-wheel, $a$, besides the ordinary cone pulley $b$; and a chain, $c$, which passes round under the chain-wheel, connects at its ends with rods $d$, which are suspended from the eccentric wrist-pins of cranks $e$, the connection between the rods $d$ and the chain $c$ being effected by screw-rods $f$, the length of which can be adjusted by nuts $g$ so that the requisite strain can be applied to the chain to keep it in gear with the chain-wheel $a$. The cranks $e$ are secured in slotted disks, $h$, which are mounted on the ends of shafts $i\,i'$, and they are so arranged that their throw can be increased or diminished at pleasure, either by making the cranks themselves adjustable, or by making the wrist-pins movable toward and from the centres of rotation of the cranks. The shafts $i\,i'$ are geared together by cog-wheels $j\,j'$, and a revolving motion is imparted to the shaft $i$ by a belt running over a pulley, $k$, or by any other suitable means.

If the lathe is to be used as an ordinary turning lathe, the chain $c$ is moved from the chain-wheel $a$, and the head-block C is moved in on the shears so as to bring the pulley on the spindle E, directly under a cone pulley mounted on the shaft $i$, and the motion of this shaft is transmitted to the spindle E by a belt in the usual manner. But for turning the bowls of pipes, or other articles where the tool is not permitted to travel clear round, the head-block C is arranged as shown in fig. 1 of the drawing, and the pipe or other article to be turned is secured on the back centre, which is provided with a sleeve, $l$, fitted closely and neatly into the bore of said bowl. The stem of the pipe catches between two pins, $m$, which project from the front surface of the loose head-block D. The back centre F is made to slide back and forth in the head-block D, and it connects, by a system of levers and rods, with the hand lever $n$, so that by throwing said hand lever in one direction the back centre is thrown back, and the article secured to the same is forced off its point by the action of the sleeve $l$. The hand lever $n$ also serves to force the article to be turned against the tools or cutters $p$, which are secured to the chuck I; and this chuck is screwed on the end of the spindle E. Said cutters are held in position by set-screws $q$, and they are fed in towards the centre of the chuck by screws $r$. Their cutting edges are formed to correspond to the shape of the article to be turned, and they act on the surface thereof as soon as an oscillating motion is imparted to the spindle E. One or more cutters may be inserted into the chuck I, and if more than one cutter is used, the motion of the spindle must be adjusted accordingly. By these means a turning lathe is obtained, which can be used with great convenience for turning those parts of the bowls of smoking-pipes where the tool cannot travel clear round, and for other articles of a similar nature, and which, by slight change in the position of the head-block C, can be readily arranged as an ordinary turning lathe.

What I claim as new, and desire to secure by Letters Patent:

1. The oscillating spindle E, in combination with a chuck I, carrying one or more tools, and with the longitudinally sliding back centre F, constructed and operating substantially as and for the purpose described.

2. Controlling the oscillations of the spindle E by means of the chain c and adjustable cranks e, substantially as and for the purpose described.

3. Giving the oscillating motion to the cutter head by means of two shafts $i\ i'$, carrying the cranks $e$ and chain $c$, substantially as and for the purpose set forth.

FRANTZ A. ARMBRUSTER.

Witnesses:
M. M. LIVINGSTON,
ALEX. F. ROBERTS.